INVENTORS
ZDENEK J. LANSKY
KURT W. LEIBFRITZ
BY
John N. Wolfram
ATTORNEY

United States Patent Office 3,420,257
Patented Jan. 7, 1969

3,420,257
PRESSURE REGULATING VALVE
Zdenek J. Lansky, Winnetka, and Kurt W. Leibfritz, Norridge, Ill., assignors to Parker-Hannifin Corporation, Cleveland, Ohio, a corporation of Ohio
Filed Sept. 4, 1964, Ser. No. 394,503
U.S. Cl. 137—116.5         15 Claims
Int. Cl. F16k *17/04;* G05d *16/02*

ABSTRACT OF THE DISCLOSURE

A pressure regulating valve in which fluid at two different pressures from two locations on the outlet side is mixed in a mixing chamber and is then directed to a fluid pressure operated means for opening and closing the valve, there also being a constantly open bleed passage connecting the outlet port to atmosphere and a relief valve for venting the outlet port when the pressure therein exceeds a predetermined value.

---

In pressure regulators of the type described, the valve member hunts for a stable position by constantly moving to slightly increase or decrease the flow as it tries to maintain a constant pressure at the downstream side.

It is an object of the present invention to provide a method of damping the movement of the valve member to reduce or eliminate the hunting motion.

It is another characteristic of this type valve that when the valve seat is of resilient material there is a delay between the closing of the relief valve and the opening of the flow passage whereby there is an undesirable drop in the regulated pressure between these two occurrences. The present invention substantially eliminates such drop in pressure by providing a small but constant bleed of regulated pressure through the relief valve and thereby makes it possible to have higher regulated pressures at any given flow rate than is obtained without the bleed.

It is another object to provide a simplified construction in which a straight knurl on the valve seat member locates the member within the valve body and also provides flow passages for the fluid which opposes the spring.

It is also an object to provide a simple means for retaining the valve seat member within the body and which means also provides one of two flow paths for fluid which counterbalances the spring.

Other objects of the invention will be apparent from the following description and from the drawing in which.

Figure 1:
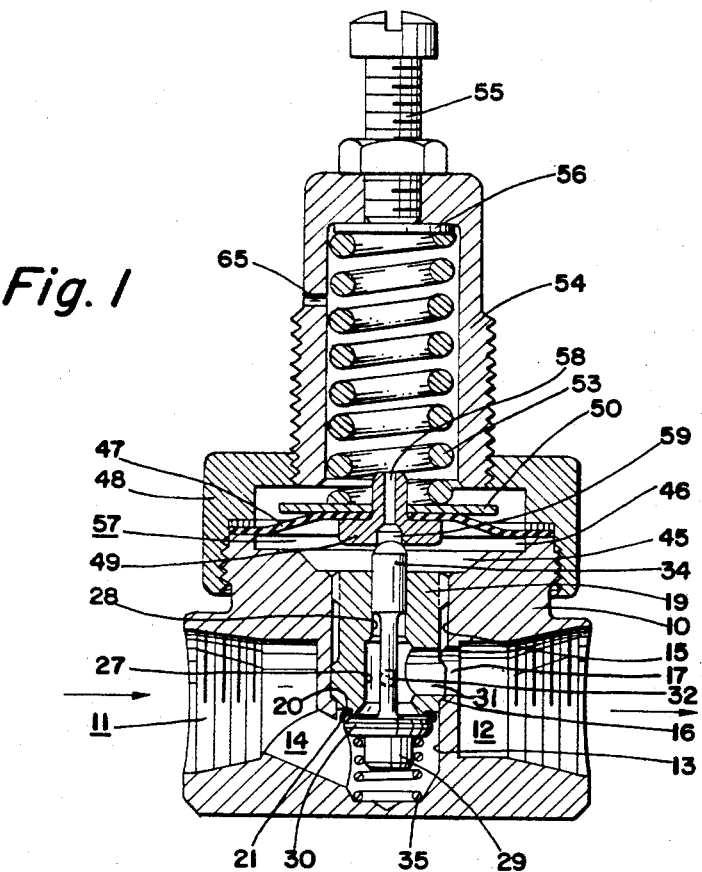
FIGURE 1 is a vertical cross section through the regulator.
Figure 2:
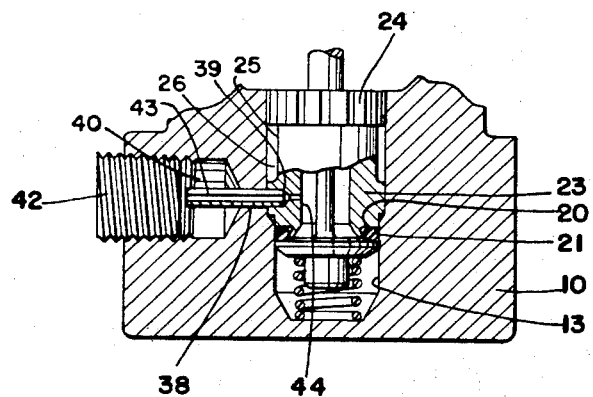
FIGURE 2 is a fragmentary section view of the lower part of the regulator in a plane at right angles to the plane of FIGURE 1.
Figure 3:
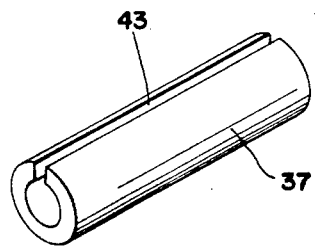
FIGURE 3 is an illustration of the roll pin which retains the valve seat element.
Figure 4:
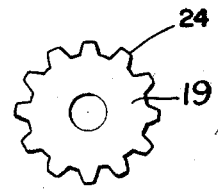
FIGURE 4 is a view of the upper end of the valve seat element.

The regulator has a body 10 having an inlet port 11 and an outlet port 12. Intermediate the two ports the body has a cylindrical bore 13 connected to inlet port 11 by a passage 14 and another cylindrical bore 15 connected to bore 13 by a bevelled portion 16 and connected to outlet 12 by a passage 17.

Mounted in bore 15 is a valve seat element 19, the lower end of which has a groove 20 in which a deformable or rubber-like seat member 21 is mounted so as to be in sealing contact with seat element 19 and bore 13.

The lower end of seat element 19 has a circular rib 23 which is a loose sliding fit within bore 15. The upper end of seat element 19 has a series of straight knurls or splines 24 about its periphery, the outer surfaces of the splines being a snug fit within bore 15 so as to radially locate seat element 19 within the bore. Intermediate the rib 23 and knurls 24 seat element 19 has a reduced diameter section 25 which provides an annular clearance 26 with bore 15, such clearance 26 constituting a mixing chamber.

Seat element 19 has a bore 27 at its lower end connected to passage 17 by passage 31 and a counterbore 28 at its upper end. A valve element 29 has a valve head 30 engageable with valve seat member 21 and has a stem 32 extending through bore 27. The stem has an enlarged guide portion 34 with a close guiding fit within counterbore 28. A light spring 35 presses valve element 29 toward its closed position.

Seat element 19 is retained in both its radial and longitudinal positions within bore 15 by a hollow roll pin 37 mounted within a bore 38 in the body and having one end projecting into a bore 39 in seat element 19. The other end of the roll pin projects within a threaded opening 40 in body 10 in which a closure plug 42 is mounted. Plug 42 may be removed and replaced by a pressure gauge, not shown. The roll pin has a longitudinal slit 43 and has a friction fit within bore 38 to prevent dislodgement from bore 39 in seat element 19. In addition, plug 42 may also prevent such dislodgement. The inner end of bore 39 is connected to bore 27 by a small drilled hole 44.

The upper end of body 10 has recesses 45, 46 into which stem guide portion 34 projects. The recesses are closed by a flexible diaphragm 47 which is clamped at its outer margin to body 10 by a nut 48 threaded to the body. The inner margin of the diaphragm is clamped between a relief valve 49 and a washer 50 by the action of spring 53. The latter is housed in a bonnet 54 threaded into nut 48 and there is an adjusting screw 55 threaded into bonnet 54 and bearing against a washer 56 for adjusting the pressure of spring 53.

Recesses 45, 46 provide a pressure chamber 57 which is closed by diaphragm 47. In a preferred embodiment of the invention, relief valve 49 has a relief passage 58 therethrough which includes a counterbore 59. The lower edge of counterbore 59 forms a valve face 61 which cooperates with a valve seat 63 on the upper end of valve element 29 for opening and closing relief passage 58. A small bleed passage 64 in the form of a V slot extends across valve face 61 to provide constant restricted communication via passage 58 between chamber 57 and the interior of bonnet 54 from which the bleed fluid has access to atmosphere past the threads of the bonnet and a vent opening 65.

In operation, fluid under pressure is admitted to inlet port 11. Spring 53 acts through relief valve 49 to normally unseat valve head 30 from seat element 21 and fluid will flow from inlet port 11 through passage 14, bore 27, passages 31 and 17 and out of the regulator through outlet port 12.

At this time fluid from passages 31 and 17 gains access to clearance 26. Fluid also passes from bore 27 through hole 44 to the interior of roll pin 37 and out through slit 43 into the slight clearance between rib 23 and bore 15 into clearance 26 where it mixes with the fluid from passages 31 and 17 before the fluid passes from clearance 26 past splines 24 into chamber 57 for acting upon diaphragm 47 in opposition to spring 53.

The pressure within chamber 57 will be nearly that of the regulated pressure in outlet port 12 and as it increases it moves diaphragm 47 upwardly against the pressure of spring 53 and this permits spring 35 to move valve head 30 toward its closed position. When the regulated pressure in outlet port 12 reaches the predetermined pressure, the corresponding pressure in chamber 57 causes diaphragm 47 to move upwardly to permit complete closing of valve head 30. Upon dropping of pressure in outlet port 12, the pressure in chamber 57 will also drop and when it falls below the predetermined value spring 53 will again cause valve head 30 to be unseated.

When drawing off of fluid through port 12 at any given flow rate, valve element 29 will try to find a position for maintaining the corresponding regulated pressure in outlet port 12.

In prior regulating valves of this type, the pressure in the outlet port fluctuates as fluid is drawn off and there is a corresponding fluctuation in the diaphragm chamber with consequent vibration or hunting motion of the valve element. The present invention dampens and substantially eliminates such vibration or hunting.

With the construction provided herein, as the gaseous fluid passes from passage 31 through passage 17 to outlet port 12 it also enters or is exposed to clearance 26 but tends to lower the pressure in clearance 26 by aspirating action. At the same time, fluid in bore 27 passes through hole 44 and the interior of roll pin 37 to port 40 from which it may pass to a pressure gauge when the latter is connected to the port in lieu of plug 42. Part of the fluid also passes through slit 43 in the roll pin into the clearance between rib 23 and bore 15 into clearance 26 where it mixes with the fluid of a different pressure induced therein by passage 17. Fluid at a resultant pressure in clearance 26 passes through splines 24 into chamber 57 to act on diaphragm 47. Because of the mixing action in clearance 26, there is a significant increase in the delay or out of phase relationship between changes in the regulated pressure downstream of valve head 30 and the corresponding changes in chamber 57 over that which is present when the flow path through the roll pin and the consequent mixing action is not provided. This greater delay substantially eliminates rapid vibration or hunting action of valve element 29 in trying to maintain a constant regulated pressure. It also substantially eliminates the squealing noise encountered in valves of this type when there is but a single path for regulated fluid to reach the diaphragm chamber.

Although it is indicated above that an aspirating action occurs at clearance 26 by action of fluid passing from passage 31 through passage 17 to port 12, it must be understood that when the pressure in passage 17 appreciably exceeds that in pressure chamber 57 there will be a passage of fluid from passage 17 to clearance 26 and then to pressure chamber 57.

As previously indicated, when the regulated pressure in outlet port 12 reaches a predetermined value, as will occur when flow is stopped downstream of the regulator valve, diaphragm 47 will move upwardly to permit initial sealing contact of valve head 30 against resilient seat member 21 for cutting off flow of fluid from inlet port 11 to outlet port 12. In the event there is a further increase of pressure in outlet port 12, diaphragm 47 will move further upwardly. During the first part of such additional upward movement, valve element 29 will also move upwardly and deform seat member 21 until further upward movement of element 29 is prevented by contact with valve seat element 19. Upon still further increase in pressure in outlet 12, diaphragm 47 will move still further upwardly and cause relief valve 49 to unseat from valve seat 63. Upon unseating of relief valve 49, further increase in pressure in outlet port 12 is prevented by relieving of the same through passage 58 and opening 65 to atmosphere.

Although upward movement of valve element 29 after initial sealing contact with resilient seat member 21, and the subsequent deformation of such member and opening of relief valve 49, will occur as just described when the pressure in outlet 12 increases beyond the determined value at which valve element 29 initially closes, bleed passage 64 is provided for normally avoiding such additional pressure increase.

Thus, when pressure in outlet port 12 reaches the predetermined value at which valve head 30 engages in initial sealing contact with resilient seat member 21, further increase of pressure in outlet port 12 is normally prevented by the bleeding of fluid therefrom through bleed passage 64 as aforesaid and valve element 29 remains substantially in its position of initial contact with seat member 21. Upon even the slightest drop in pressure in outlet port 12 below the predetermined value, valve element 29 will immediately unseat from seat member 21 to re-establish flow through the regulator valve. Thus the use of bleed passage 59 in practical effect makes the opening and closing pressure for valve head 30 correspond substantially to the relief pressure.

In fluid pressure systems there is usually a predetermined maximum pressure for normal operation and a relief valve is set to open at this figure to prevent higher pressures from occurring. Without bleed passage 64 the relief pressure is necessarily higher than the opening and closing pressures for valve head 30 because of the deformation of resilient seat member 21. With bleed passage 64 the normally effective relief pressure is the same as the opening and closing pressure for valve head 30. Thus, for any desired normal relief pressure the opening pressure for valve head 30 is higher with bleed passage 64 and not only is the drop in pressure between relief of port 12 and opening of valve head 30 eliminated, but also the regulated pressure will be higher at any given flow rate through the valve.

Figure 5:
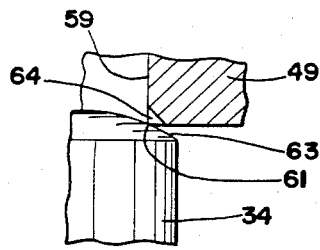
FIGURE 5 is a fragmentary section view showing the constant bleed passage through the relief valve.
Figure 6:
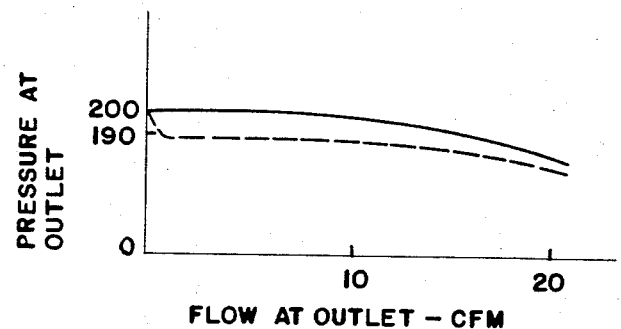
FIGURE 6 shows pressure versus flow curves with and without the bleed passage at the relief valve.

Thus, for example, the dotted curve in FIGURE 5 may represent the flow versus regulated pressure for a valve in which bleed passage 64 is omitted. In this case, the normal maximum pressure in outlet port 12 may be 200 p.s.i. and this is achieved by setting spring 53 so that relief valve 49 will open at this pressure, such opening occurring only after element 29 has moved upwardly from its initial position of sealing contact with element 21 and deformed the latter until valve head 30 has seated against seat element 19. To return element 29 to its ready to open position where there is no deformation of element 21 may require a 10 p.s.i. drop in pressure in outlet port 12, that is, a drop from 200 p.s.i. to 190 p.s.i. This drop in pressure is frequently referred to as "regulator droop."

By contrast, when bleed passage 64 is utilized and the desired normal maximum pressure in outlet port 12 is 200 p.s.i., bleed passage 64 will come into play as soon as valve head 30 has established initial sealing contact with element 21 to maintain this maximum pressure and there is no upward movement of element 29 for deforming element 21 after such initial closing contact. As a result, as soon as there is any decrease whatsoever in the pressure within outlet port 12, element 29 will disengage from sealing contact with element 21 to establish flow through the valve, as indicated by the solid curve of FIGURE 5. Thus there is no appreciable "regulator droop" or drop in pressure between the normal maximum pressure in outlet port 12 and the pressure therein at which flow through the valve is reinstated. It is then apparent from FIGURE 5 that at any given flow rate through the valve the regulated pressure is higher when bleed passage 64 is utilized than otherwise.

Valve face 61 provides a convenient location for bleed passage 64 but the latter can be located elsewhere, as for example, it could be in the form of a small drilled hole through body 10 connecting port 12 to the atmosphere. Likewise, many other changes may be made in the detail construction and arrangement of the parts within the scope of the invention as defined by the claims.

We claim:

1. A pressure regulator valve comprising a body having inlet and outlet passages with a valve seat therebetween, a valve element co-operable with said seat for controlling flow of fluid between said passages, means biasing the valve toward open position, a pressure chamber, fluid pressure operated means forming a movable wall of said pressure chamber opposing said biasing means, a mixing chamber having stationary walls, and passage means for directing fluid from two locations in said outlet passage having different fluid pressures therein to said mixing chamber, and additional passage means for directing fluid under pressure from said mixing chamber to said fluid pressure operated means.

2. A pressure regulator valve comprising a body having a bore and having inlet and outlet passages communicating with the bore, a seat element in said bore having a valve seat, a valve element cooperable with said seat for controlling flow of fluid between said passages, means biasing the valve element toward open position, a pressure chamber in said body, a mixing chamber having stationary walls communicating with the pressure chamber, a fluid pressure operated means exposed to fluid in said pressure chamber for opposing said biasing means, passage means between said seat element and said bore for directing fluid to said mixing chamber, means for simultaneously producing different fluid pressures at two locations in said outlet passages and means for directing fluid from said two locations to said passage means.

3. The valve of claim 2 in which said passage means includes an annular clearance between said seat element and said bore.

4. A pressure regulator valve comprising a body having a bore and having inlet and outlet passages, a seat element in said bore having a passage communicating with said inlet and outlet passages and surrounded by a valve seat, a valve element cooperable with said seat for controlling the flow of fluid through said element passage, a spring biasing said valve element toward open position, a fluid pressure chamber, fluid pressure operated means exposed to fluid in said chamber opposing said spring, a clearance between said seat element and said bore communicating with said chamber, first passage means connecting the clearance with said element passage at one location, second passage means connecting the clearance with said element passage at another location, said first and second passage means being constructed to cause different pressure drops in fluid passing therethrough from said element passage to said clearance.

5. The valve of claim 4 in which said first passage means comprises a relatively large opening between said element passage and said outlet passage and communicating with said clearance, and said second passage means includes a relatively small opening between said element passage and said clearance.

6. The valve of claim 4 in which said seat element is fixedly positioned relative to said body by a hollow pin having an opening through the wall thereof which serves as a part of said first passage means.

7. The valve of claim 4 in which said seat element has longitudinal splines adjacent said clearance which are a close fit within said bore for laterally locating said seat element, the spaces between said splines serving to communicate the clearance with the chamber.

8. The valve of claim 4 in which said clearance is greater at one portion of said seat element than at another and said first passage means communicates with the clearance where it is greater and said second passage means communicates with the clearance where it is smaller.

9. A pressure regulator valve comprising a body having a bore and having inlet and outlet passages, a seat element in said body bore having an axial bore communicable with said inlet passage, means for opening and closing said axial bore, said seat element having a radially extending passage leading from the axial bore and registering with said outlet passage, a pin mounted in said body and extending into an opening in said seat element for fixing the radial and axial position of said seat element relative to said body, said body having a port open to the exterior thereof, said pin extending into said port so as to be accessible therefrom for removing the same, and said pin being hollow and communicating with the interior of said seat element for conducting fluid within said seat element to said port.

10. A pressure regulator valve comprising a body having a bore and having inlet and outlet passages, a seat element in said body bore having an axial bore communicable with said inlet passage, means for opening and closing said axial bore, said seat element having a radially extending passage leading from the axial bore and registering with said outlet passage, a pin mounted in said body and extending into an opening in said seat element for fixing the axial and radial position of said seat element relative to said body, said body having a port open to the exterior thereof for connection to a pressure gage, and said pin having a passage therein that conducts fluid from the interior of said seat element to said port.

11. A pressure regulator valve comprising a body having inlet and outlet passages with a valve seat therebetween, a valve element co-operable with said seat for controlling flow of fluid between said passages, means biasing the valve toward open position, fluid pressure operated means for opposing said biasing means, means for directing fluid from said outlet passage to said fluid pressure operated means, means including a restricted passage constantly connecting said outlet passage to atmosphere, a relief valve for venting the outlet passage to atmosphere when the pressure in the latter exceeds a predetermined value, said relief valve including a valve seat engageable by a valve face and said restricted passage being formed in one of said valve seat and valve face.

12. A pressure regulator valve in accordance with claim 11 in which one of said engageable valve seat and valve face is movable with said fluid pressure operated means and the other is carried by the valve element.

13. A pressure regulator valve comprising a body having inlet and outlet passages with a valve seat therebetween, said valve seat including a deformable member, a valve element movable into and out of engagement with the deformable member for controlling flow of fluid between the inlet and outlet passages, said valve element being movable from a first closed position in which it establishes initial sealing contact with the deformable member to a second closed position in which it deforms said deformable member, first means for moving the valve element in a closing direction, a relief valve member having a relief passage therethrough for connecting the outlet passage to the atmosphere when the relief valve member is in open position, said relief valve member being pressed by a spring into engagement with the valve element for closing said relief passage and for moving said valve element to an open position away from said deformable member, fluid pressure operated means responsive to a first predetermined pressure in said outlet passage for moving the relief valve in opposition to said spring whereby said first means may move the valve element to said first closed position and responsive to pressure in said outlet passage greater than said first predetermined pressure for moving said relief valve to a position whereby said first means may move the valve element to said second closed position, said fluid pressure operated means being responsive to a second predetermined pressure in said outlet passage for moving said relief valve member out of engagement with said valve element for opening said relief passage, and a restricted passage constantly connecting said outlet passage to the atmosphere for normally preventing the pressure in the outlet passage from exceeding said first predetermined pressure.

14. A regulator valve in accordance with claim 13 in which said restricted passage connects the outlet passage with said relief passage.

15. A regulator valve in accordance with claim 13 in which there is a passage means for directing fluid from two different locations in said outlet passage to said fluid pressure operated means.

References Cited

UNITED STATES PATENTS

| | | | |
|---|---|---|---|
| 3,298,385 | 1/1967 | Jackson et al. | 137—112 |
| 510,635 | 12/1893 | Duval | 137—116 |
| 847,944 | 3/1907 | Hubner et al. | 137—484 |
| 2,294,314 | 8/1942 | McKinley | 137—484 |
| 2,305,975 | 12/1942 | McKinley | 137—484 |
| 2,761,464 | 9/1956 | Faust | 137—116 |
| 3,062,525 | 11/1962 | Schutmaat | 137—513 |

WILLIAM F. O'DEA, *Primary Examiner.*

DAVID J. ZOBKIW, *Assistant Examiner.*

U.S. Cl. X.R.

137—484.6